United States Patent
Alfieri et al.

(10) Patent No.: US 7,120,653 B2
(45) Date of Patent: Oct. 10, 2006

(54) METHOD AND APPARATUS FOR PROVIDING AN INTEGRATED FILE SYSTEM

(75) Inventors: Robert A. Alfieri, Chapel Hill, NC (US); Radoslav Danilak, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 548 days.

(21) Appl. No.: 10/145,578

(22) Filed: May 13, 2002

(65) Prior Publication Data

US 2003/0212683 A1    Nov. 13, 2003

(51) Int. Cl.
- G06F 12/00 (2006.01)
- G06F 17/30 (2006.01)
- G06F 15/16 (2006.01)

(52) U.S. Cl. .................... 707/204; 707/10; 709/231; 709/227

(58) Field of Classification Search ................ 707/200, 707/10, 1, 204; 709/200, 231, 227; 380/28, 380/44
See application file for complete search history.

(56) References Cited

U.S. PATENT DOCUMENTS

| | | | | |
|---|---|---|---|---|
| 5,479,512 A | * | 12/1995 | Weiss ........................ | 380/28 |
| 5,530,235 A | * | 6/1996 | Stefik et al. ................ | 235/492 |
| 5,644,204 A | * | 7/1997 | Nagle ..................... | 318/568.12 |
| 5,666,487 A | * | 9/1997 | Goodman et al. .......... | 709/246 |
| 5,949,879 A | * | 9/1999 | Berson et al. .............. | 713/179 |
| 5,991,403 A | * | 11/1999 | Aucsmith et al. .......... | 380/217 |
| 6,065,037 A | * | 5/2000 | Hitz et al. .................. | 709/200 |
| 6,081,764 A | * | 6/2000 | Varon ........................ | 701/120 |
| 6,154,542 A | * | 11/2000 | Crandall ...................... | 380/28 |
| 6,157,720 A | * | 12/2000 | Yoshiura et al. .............. | 380/44 |
| 6,411,714 B1 | * | 6/2002 | Yoshiura et al. ............ | 380/269 |
| 6,795,849 B1 | * | 9/2004 | Hamlin ....................... | 709/213 |
| 2003/0120795 A1 | * | 6/2003 | Reinshmidt ................. | 709/232 |

OTHER PUBLICATIONS

Petal: Distributed Virtual Disks, Edward K. Lee et al., System Research Center, Digital Equipment Corporation, 1996.*

* cited by examiner

Primary Examiner—John R. Cottingham
Assistant Examiner—Kuen S. Lu
(74) Attorney, Agent, or Firm—Patterson & Sheridan, L.L.P.

(57) ABSTRACT

A novel network architecture that integrates the functions of an internet protocol (IP) router into a network processing unit (NPU) that resides in a host computer's chipset such that the host computer's resources are perceived as separate network appliances. In one embodiment, file handling functions are now integrated into a storage processing unit (SPU) that can also be deployed on the same chipset, where the SPU serves as an overall file and disk management processor.

44 Claims, 7 Drawing Sheets

METHOD AND APPARATUS FOR PROVIDING AN INTEGRATED FILE SYSTEM

The present invention relates to a novel network architecture. More specifically, the present invention integrates local and remote file handling into a host computer's chipset such that the host OS will perceive the chipset as an endpoint for data storage.

BACKGROUND OF THE DISCLOSURE

FIG. 1 illustrates traditional internal content sources and data pipes where the data routing function is performed by a host central processing unit (CPU) and its operating system (OS) 110. Namely, the host computer may comprise a number of storage devices 120, a plurality of media engines 130, and a plurality of other devices that are accessible via input/output ports 140, e.g., universal serial bus (USB) and the like. In turn, the host computer may access a network 150 via application programming interfaces (APIs) and a media access controller (MAC).

However, a significant drawback of this data routing architecture is that the host computer's resources or devices are only accessible with the involvement of the host CPU/OS. Typically, accessing the host resources from external computers is either prohibited or it is necessary to request access through the host computer using high-level protocols. If the host CPU/OS is overtaxed, a substantial latency will exist where data flow may be stuck in the OS stacks.

For example, in the field of file handling, various file processing functions such as encryption and compression are performed by a file system layer of the OS. However, this approach requires the involvement of the host OS.

Therefore, a need exists for a novel network architecture that allows a host computer's resources to be perceived as separate network appliances and are accessible without the interference of the host computer's CPU/OS.

SUMMARY OF THE INVENTION

The present invention is a novel network architecture. More specifically, the present invention integrates the functions of an internet protocol (IP) router into a network processing unit (NPU) that resides in a host computer's chipset such that the host computer's resources are perceived as separate network appliances. The NPU appears logically separate from the host computer even though, in one embodiment, it is sharing the same chip. A host computer's "chipset" is one or more integrated circuits coupled to a CPU that provide various interfaces (e.g., main memory, hard disks, floppy, USB, PCI, etc), exemplified by Intel's Northbridge and Southbridge integrated circuits.

In operation, the host computer has a virtual port (i.e., host MAC) that is in communication with the network processing unit and communicates with the NPU as if it is an external network appliance using standard networking protocols. In one embodiment, the host computer communicates via the NPU with one or more auxiliary or dedicated processing units that are deployed to perform dedicated tasks. These auxiliary processing units can be part of the host or can be deployed separate from the host to meet different application requirements. For example, some of these auxiliary processing units include, but are not limited to, a graphics processing unit (GPU), an audio processing unit (APU), a video processing unit (VPU), a storage processing unit (SPU), and a physics processing unit (PPU). The present disclosure refers to these auxiliary processing units as XPU, where the "X" is replaced to signify a particular function performed by the processing unit. Finally, the network processing unit itself is an XPU because it can, in addition to routing packets among XPUs, perform various processing accelerations on these packets, such as authentication, encryption, compression, TCP, IPSec/VPN/PPP encapsulation and so on.

One unique aspect of the present Invention is that the XPUs have logically direct attachments to the NPU which effectively serves as an integrated router, thereby allowing XPUs to be seen as separate network appliances. Since these auxiliary processing units have first-class status in this logical network architecture, they are allowed to communicate with each other or with any external computer (e.g., via another NPU) directly using standard internet protocols such as IP, TCP, UDP and the like without the involvement of the host CPU/OS. Using this novel architecture, the NPU provides both local (or host) access and remote access acceleration in a distributed computing environment.

Furthermore, by virtualizing the remaining resources of the host computer, such as its physical memory, ROM, real-time clocks, interrupts, and the like, the present invention allows a single chipset to provide multiple, virtual host computers with each being attached to this NPU. Each of these virtual computers or virtual host may run its own copy of an identical or different operating system, and may communicate with other virtual computers and integrated networked appliances using standard networking protocols. Effectively, the present invention embodies its own hardware-level operating system and graphical user interface (GUI) that reside below the standard host operating system and host computer definition, and allow the computer user to easily configure the network or to switch from one virtual computer to another without changing the standard definition of that host computer.

In one embodiment, file handling functions previously performed by the host OS is now integrated into a file management layer of a chipset. In effect, the SPU serves as an overall file and disk management processor.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
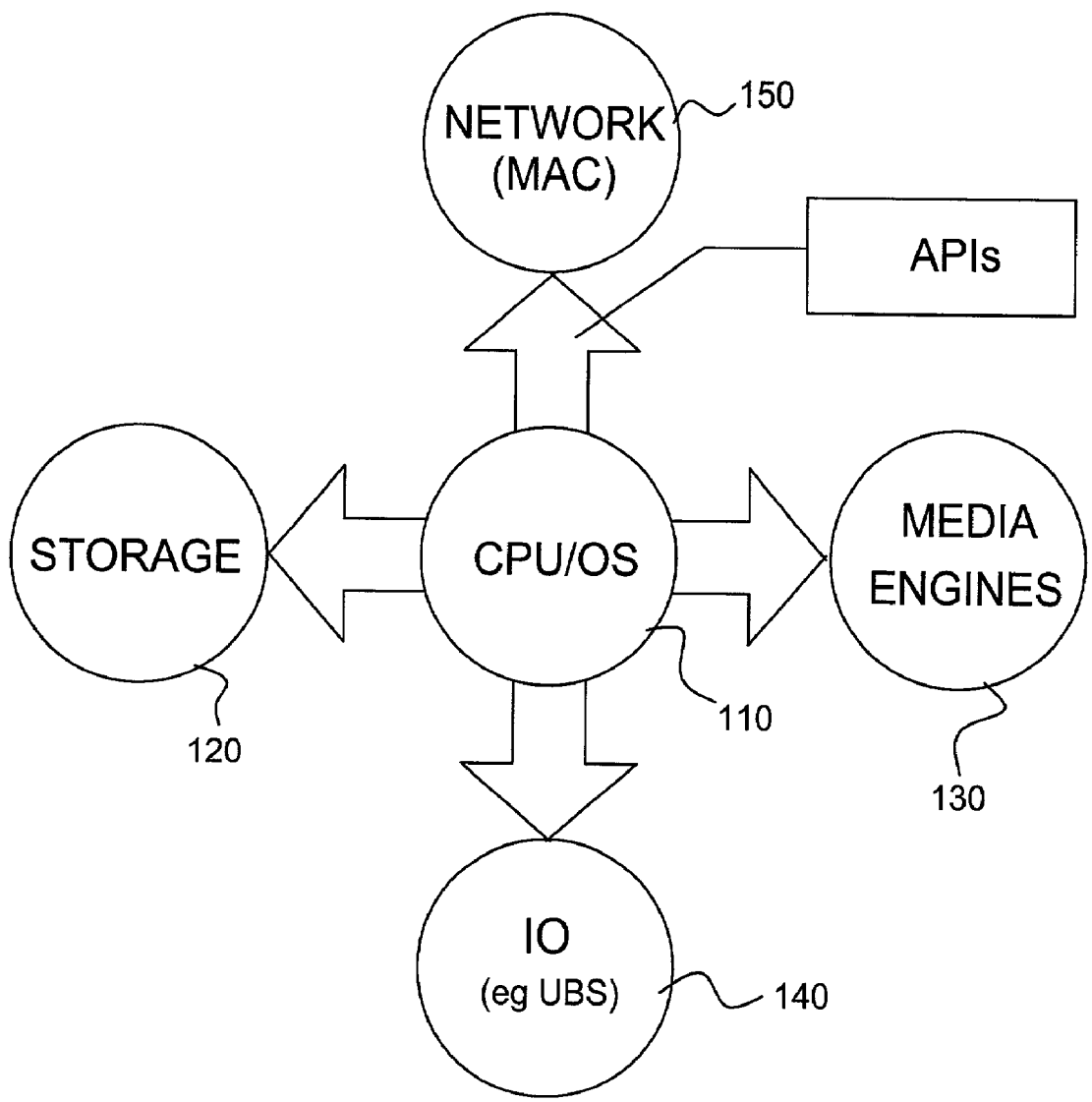
FIG. 1 illustrates a block diagram of conventional internal content sources and data pipes.
Figure 2:
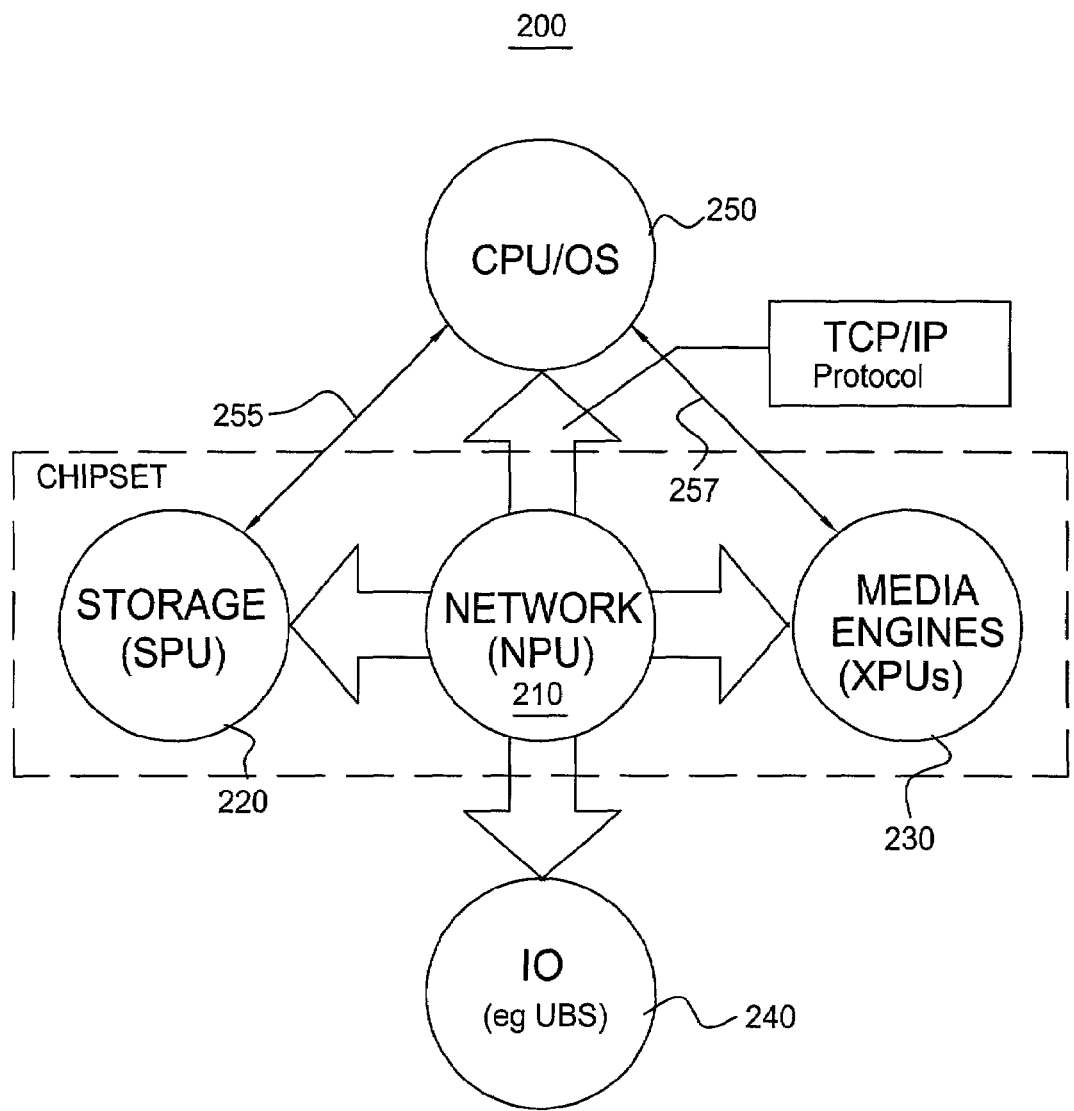
FIG. 2 illustrates a block diagram of novel internal content sources and data pipes of the present invention.

FIG. 2 illustrates a block diagram of novel internal content sources and data pipes 200 of the present invention. Unlike FIG. 1, the present network architecture has a network processing unit 210 of the present invention at the center of the internal content sources and data pipes. The host CPU/OS 250 is no longer central to the data routing scheme. One advantage of this new architecture is that the NPU 210 provides both local or host access and remote access acceleration.

An operating system is any software platform for application programs; typical examples are Microsoft Windows, Unix, and Apple Macintosh OS. An operating system can be run on top of another operating system (an example of a virtual operating system) or another underlying software platform, possibly as an application program.

In operation, the host CPU/OS 250 has a virtual port (i.e., host MAC) that is in communication with the network processing unit 210 and communicates with the NPU as if it is an external network appliance using standard networking protocols, e.g., TCP/IP protocols. In one embodiment, the host computer communicates via the NPU with one or more auxiliary or dedicated processing units 220, 230 that are deployed to perform dedicated tasks. These auxiliary processing units can be part of the host or can be deployed separate from the host to meet different application requirements.

For example, some of these auxiliary processing units include, but are not limited to, a graphics processing unit (GPU), an audio processing unit (APU), a video processing unit (VPU), a physics processing unit (PPU) and a storage processing unit (SPU) 220. Some of these auxiliary processing units can be deployed as part of the media engines 230, whereas the SPU 220 is deployed with the storage devices of the host. Finally, the network processing unit itself is an XPU because it can, in addition to routing packets among XPUs, perform various processing accelerations on these packets, such as authentication, encryption, compression, TCP, IPSec/VPN/PPP encapsulation and so on.

In one embodiment, the NPU 210 is a network router appliance that resides inside the same "box" or chassis as the host computer 250, i.e., typically within the same chipset. The NPU serves to connect various other "XPUs" that performed dedicated functions such as:

1) Storage Processing Unit (SPU) is an auxiliary processing unit that implements a file system, where the file system can be accessed locally by the host or remotely via the NPU's connection to the outside world. The SPU is a special XPU because it behaves as an endpoint for data storage. Streams can originate from an SPU file or terminate at an SPU file.

2) Audio Processing Unit (APU) is an auxiliary processing unit that implements audio affects on individual "voices" and mixes them down to a small number of channels. APU also performs encapsulation/decapsulation of audio packets that are transmitted/received over the network via the NPU.

3) Video Processing Unit (VPU) is an auxiliary processing unit that is similar to the APU except that it operates on compressed video packets (e.g., MPEG-2 compressed), either compressing them or uncompressing them. The VPU also performs encapsulations into bitstreams or network video packets.

4) Graphics Processing Unit (GPU) is an auxiliary processing unit that takes graphics primitives and produces (partial) frame buffers. The GPU is a special XPU because it acts as an endpoint for rendered graphics primitives. Streams can terminate at a GPU frame buffer or originate as raw pixels from a frame buffer.

5) Physics Processing Unit (PPU) is an auxiliary processing unit that takes object positions, current velocity vectors, and force equations, and produces new positions, velocity vectors, and collision information.

6) Network Processing Unit (NPU) is itself an XPU because it can, in addition to routing packets among XPUs, perform various processing accelerations on these packets, such as authentication, encryption, compression, TCP, IPSec/VPN/PPP encapsulation and the like.

Some of the above XPUs have a number of commonalities with respect to their association with the host 250 and the NPU 210. First, an XPU can be accessed directly by the host CPU and O/S 250 directly as a local resource. Namely, communication is effected by using direct local communication channels.

Figure 3:
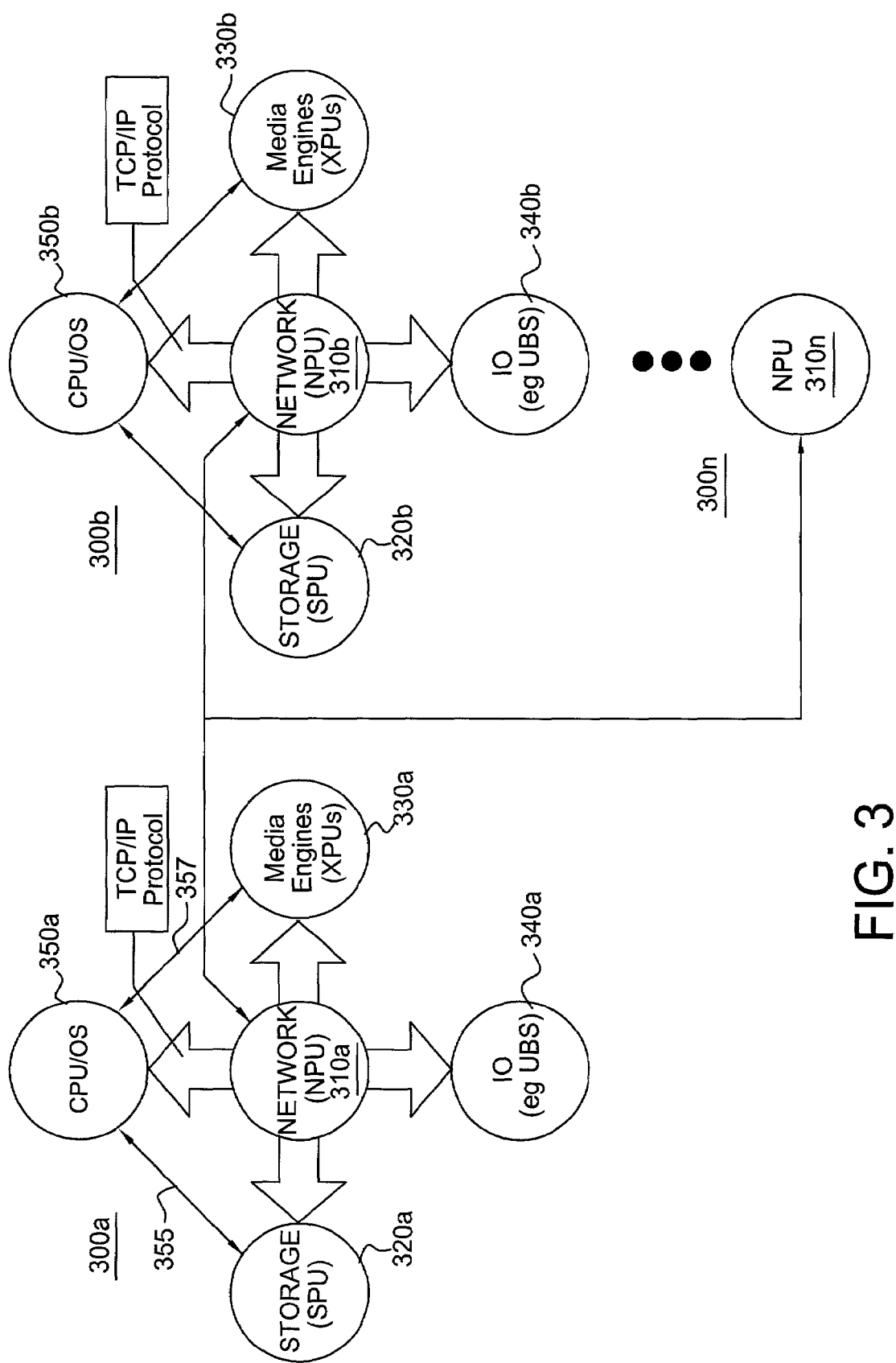
FIG. 3 illustrates a block diagram where a network of host computers are in communication with each other via a plurality of network processing units.

Second, an XPU can be placed on the network via the NPU and accessed remotely from other network nodes (as shown in FIG. 3 below). This indicates that an XPU is capable of processing information that is encapsulated in network packets.

Third, an XPU can be accessed as a "remote" node even from the local host. Namely, communication is effected via the NPU by using network protocols.

Fourth, an XPU is always in an "on" state (like most appliances) even when the host (CPU+O/S) is in the "off" state. This unique feature allows the XPUs to operate without the involvement of the host CPU/OS, e.g., extracting data from a disk drive of the host without the involvement of the host. More importantly, the host's resources are still available even though the CPU/OS may be in a dormant state, e.g., in a sleep mode.

Fifth, an XPU has at least two sets of processing queues, one for non-real-time packets and at least one for real-time packets. This duality of queues combined with similar real-time queues in the NPU, allows the system of NPU and XPUs to guarantee latencies and bandwidth for real-time streams.

Sixth, an XPU has two software (SW) drivers, one that manages the host-side connection to the XPU, and one that manages the remotely-accessed component of the XPU. In operation, the SW drivers communicate with the XPU using abstract command queues, called push buffers (PBs). Each driver has at least one PB going from the driver to the XPU and at least one PB going from the XPU to the driver.

Seventh, an XPU can also be accessed on the host side directly by a user-level application. Namely, this involves lazy-pinning of user-space buffers by the O/S. Lazy-pinning means to lock the virtual-to-physical address translations of memory pages on demand, i.e., when the translations are needed by the particular XPU. When the translations are no longer needed, they can be unlocked, allowing the operating system to page out those pages. The virtual-to-physical mappings of these buffers are passed to the XPU. A separate pair of PBs are linked into the user's address space and the O/S driver coordinates context switches with the XPU.

Although the present invention discloses the use of a network processing unit 210 to perform routing functions without the involvement of the CPU/OS, the CPU/OS 250 nevertheless still has an alternate direct communication channel 255 with its resources, e.g., storage devices. This provides the host CPU/OS with the option of communicating with its resources or media engines via the NPU or directly via local access channels 255 or 257.

In fact, although the CPU/OS is not involved with the general routing function, in one embodiment of the present invention, exception routing issues are resolved by the host CPU/OS. For example, if the NPU receives a packet that it is unable to process, the NPU will forward the packet to the host CPU/OS for resolution. This limited use of the CPU/OS serves to accelerate host processing, while retaining the option to more judiciously use the processing power of the host CPU/OS to resolve difficult issues.

Additionally, the host resources may also be accessed via the NPU without the involvement of the host CPU/OS 250 via input/output communication channel 240, e.g., via an USB. For example, the present architecture can virtualize the remaining resources of the host computer 250, such as its physical memory, read only memory (ROM), real-time clocks, interrupts, and so on, thereby allowing a single chipset to provide multiple virtual hosts with each host being attached to the NPU 210.

One unique aspect of the present Invention is that the XPUs have logically direct attachments to the NPU that effectively serves as an integrated router, thereby allowing XPUs to be seen as separate network appliances. Since these auxiliary processing units have first-class status in this logical network architecture, they are allowed to communicate with each other or with any external computer (e.g., via another NPU) directly using standard internet protocols such as IP, TCP, UDP and the like without the involvement of the host CPU/OS. Using this novel architecture, the NPU provides both local (or host) access and remote access acceleration in a distributed computing environment.

FIG. 3 illustrates a block diagram where a network of host computers 300a–n are in communication with each other via a plurality of network processing units 310a–n. This unique configuration provides both host access and remote access acceleration. The accelerated functions can be best understood by viewing the present invention in terms of packetized streams.

Figure 4:
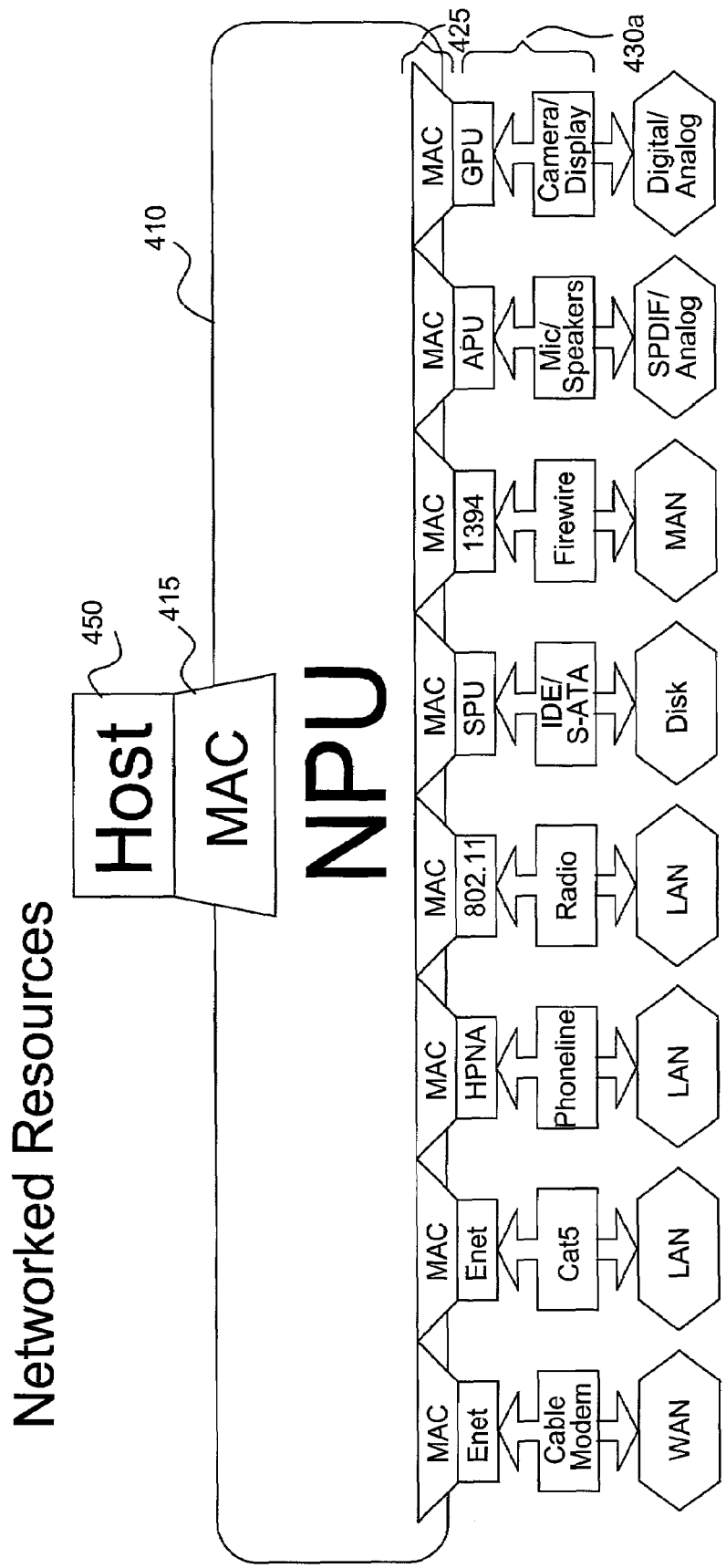
FIG. 4 illustrates a block diagram where a host computer's resources are networked via a network processing unit of the present invention.

It is best to view this system of NPU and XPUs in the context of streams of packetized data that flow within this system. There are various types of streams that are allowed by the system. In this discussion, the term "host" means the combination of host CPU and memory in the context of the O/S kernel or a user-level process. The term "node" refers to a remote networked host or device that is attached to the NPU via a wired or wireless connection to a MAC that is directly connected to the NPU (e.g., as shown in FIG. 4 below).

A host-to-XPU stream is a stream that flows directly from the host 350a to the XPU 330a. This is a typical scenario for a dedicated XPU (e.g., a dedicated GPU via communication path 357). The stream does not traverse through the NPU 310a.

An XPU-to-host stream is a stream that flows directly from the XPU to the host. One example is a local file being read from the SPU 320a via path 355. The stream does not traverse through the NPU 310a.

A host-to-XPU-to-host stream is a stream that flows from host 350a to an XPU 330a for processing then back to the host 350a. One example is where the host forwards voice data directly to the APU for processing of voices into final mix buffers that are subsequently returned to the host via path 357. The stream does not traverse through the NPU 310a.

A host-to-NPU-to-XPU stream is a networked stream that flows from the host 350a via NPU 310a to an XPU 330a or 320a. The three parties transfer packetized data using standard networking protocols, e.g., TCP/IP.

An XPU-to-NPU-to-Host is a networked stream that flows from an XPU 330a or 320a via the NPU 310a to the host 350a. The three parties transfer packetized data using standard networking protocols, e.g., TCP/IP.

A host-to-NPU-to-XPU-to-NPU-to-host is a networked stream that is the combination of the previous two streams. The three parties transfer packetized data using standard networking protocols, e.g., TCP/IP.

A host-to-NPU-to-Node is a networked stream that flows from the host 350a via the NPU 310a to a remote node (e.g., NPU 310b). This allows a local host 350a to communicate and access XPUs 330b of another host via a second NPU 310b.

A Node-to-NPU-to-Host is a reverse networked stream where the stream flows from a remote node (e.g., NPU 310b) via the NPU 310a to the host 350a. This allows a remote NPU 350b to communicate with a local host 350a via a local NPU 310a.

A Node-to-NPU-to-XPU is a networked stream that flows from a remote node 350b via the NPU 350a to an XPU 330a where it terminates. This allows a remote NPU 310b to communicate with a local XPU 330a via a local NPU 310a.

An XPU-to-NPU-to-Node is a networked stream that flows from an XPU 330a where it originates to a remote node (e.g., NPU 310b) via local NPU 310a.

A Node0-to-NPU-to-XPU-to-NPU-to-Node1 is a combination of the previous two streams. It should be noted that Node0 and Node1 may be the same or different. For example, Node0 is 310a; NPU is 310b; XPU is 330b; NPU is 310b; and Node1 is 310n. Alternatively, Node0 is 310a; NPU is 310b; XPU is 330b; NPU is 310b; and Node1 is 310a.

A {Host,Node0,XPU0}-to-NPU-to-XPU1-to-NPU-to-XPU2-to-NPU-to{Host,Node1,XPU3} is a stream that originates from the host, a remote node, or an XPU, passes through the NPU to another XPU for some processing, then passes through the NPU to another XPU for some additional processing, then terminates at the host, another remote node, or another XPU. It should be clear that the present architecture of a network of integrated processing units provides a powerful and flexible distributed processing environment, where both host access and remote access acceleration are greatly enhanced.

Under the present architecture, numerous advantages are achieved. First, it is beneficial to tightly integrate other computers and network appliances into the same chipset. Second, it is very advantageous to offload a host computer's I/O functions into a distributed network of intelligent processors, where traditional latencies associated with overtaxed CPU/OS are resolved. Third, it is advantageous to provide these auxiliary I/O processors with first-class network-appliance status within the chipset without changing the definition of the host computer. Fourth, it is advantageous to allow these auxiliary I/O processors to be shared among the host computer, external computers, and internal and external network appliances. Fifth, it is advantageous to allow the remaining resources of the host computer to be virtualized so that multiple virtual copies of the host computer may be embodied in the same chipset, while sharing the network of intelligent auxiliary I/O processors. Finally, it is advantageous to use a hardware-level operating system and graphical user interface (GUI) that allow the user to configure the network and seamlessly switch among virtual copies of the host computer or virtual host.

In one embodiment of the present invention, real-time media streaming is implemented using the above described network of integrated processing units. Specifically, media streaming typically involves multiple software layers. Thus, latencies can be unpredictable, particularly when the software runs on a general-purpose computer. More importantly, media streaming typically has a severe adverse impact on other applications running on the host computer.

However, by attaching media devices such as an APU or GPU to an NPU+SPU combination, it is now possible to minimize and guarantee latencies as well as offload the main host CPU. For example, referring to FIG. 3, control requests may arrive from a remote recipient 350b (typically attached wireless). These control requests may include play, stop, rewind, forward, pause, select title, and so on. Once the stream is set up, the raw data can be streamed directly from a disk managed by the SPU 320a through the NPU 310a to the destination client. Alternatively, the data may get preprocessed by the GPU 330a or APU 330a prior to being sent out via the NPU 310a. One important aspect again is that real-time media streaming can take place without host CPU 350a involvement. Dedicated queuing throughout the system will guarantee latencies and bandwidth.

This media streaming embodiment clearly demonstrates the power and flexibility of the present invention. One practical implementation of this real-time media streaming embodiment is within the home environment, where a centralized multimedia host server or computer has a large storage device that contains a library of stored media streams or it may simply be connected to a DVD player, a "PVR" (personal video recorder) or "DVR" (digital video recorder). If there are other client devices throughout the home, it is efficient to use the above network architecture to implement real-time media streaming, where a media stream from a storage device of the host computer can be transmitted to another host computer or a television set in a different part of the home. Thus, the real-time media streaming is implemented without the involvement of the host computer and with guaranteed latencies and bandwidth.

FIG. 4 illustrates a block diagram where a host computer's resources are networked via a network processing unit 410 of the present invention. Specifically, a host 450 communicates with the NPU 410 via a MAC 415 (i.e., a host MAC). In turn, a plurality of XPUs and other host resources 430a are connected to the NPU via a plurality of MACs 425 that interface with a MAC Interface (MI) (not shown) of the NPU. One example of an NPU is disclosed in U.S. patent application entitled "A Method And Apparatus For Performing Network Processing Functions" with attorney docket NVDA/P000413.

Figure 5:
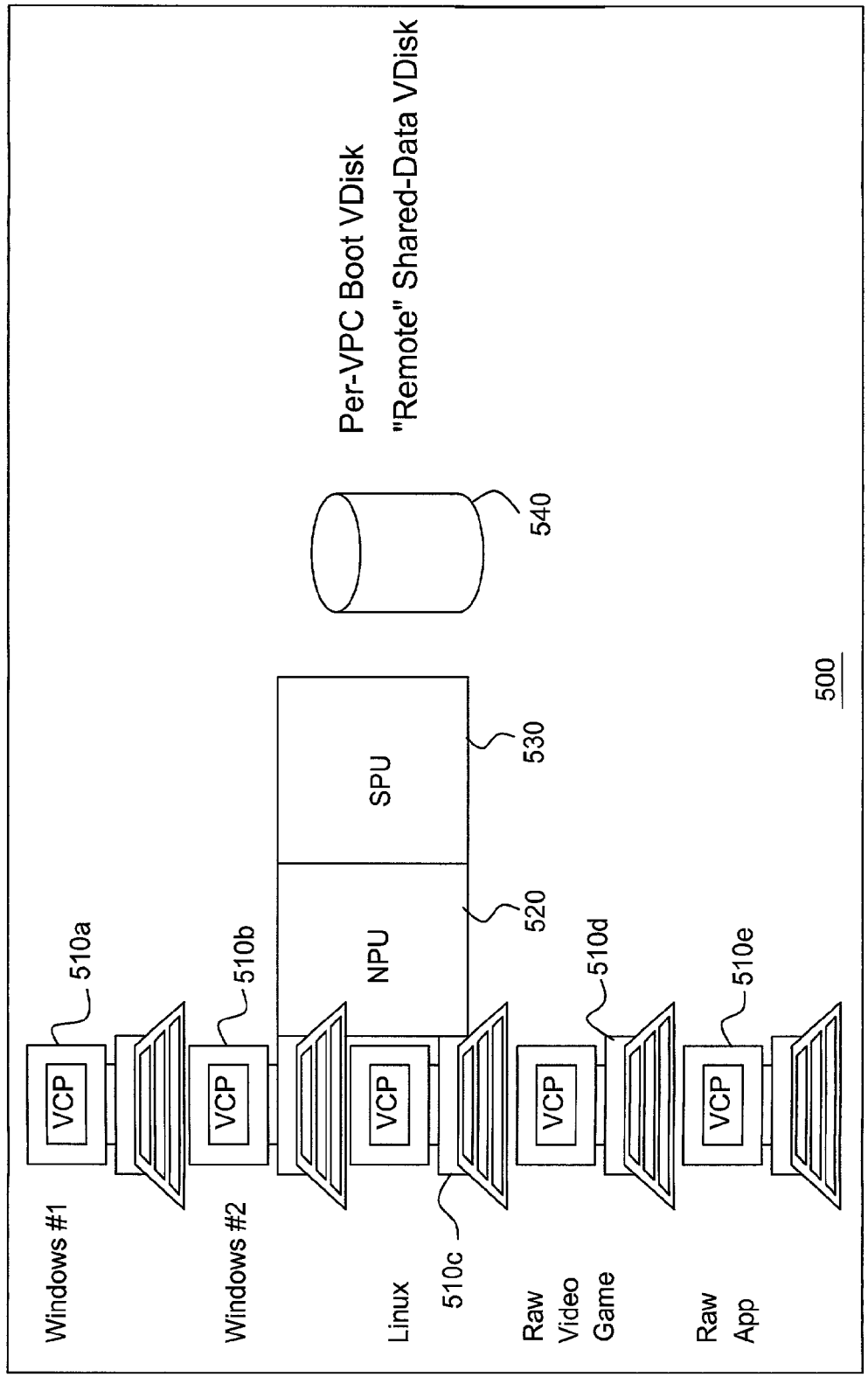
FIG. 5 illustrates a block diagram of a network of virtual personal computers in communication with a network processing unit of the present invention.

FIG. 5 illustrates a block diagram of a network of virtual personal computers or virtual hosts that are in communication with a network processing unit 520 of the present invention. More specifically, FIG. 5 illustrates a network of virtual personal computers (VPCs) in a single system (or a single chassis) 500, where the system may be a single personal computer, a set top box, a video game console or the like.

In operation, FIG. 5 illustrates a plurality of virtual hosts 510a–e, which may comprise a plurality of different operating systems (e.g., Microsoft Corporation's Windows (two separate copies 510a and 510b), and Linux 510c), a raw video game application 510d or other raw applications 510e, where the virtual hosts treat the storage processing unit 530 as a remote file server having a physical storage 540. In essence, one can perceive FIG. 5 as illustrating a "network of VPCs in a box".

In one embodiment, the NPU 520 manages multiple IP addresses inside the system for each VPC. For example, the NPU 520 may be assigned a public IP address, whereas each of the VPCs is assigned a private IP address, e.g., in accordance with Dynamic Host Configuration Protocol (DHCP). Thus, each of the VPCs can communicate with each other and the SPU using standard networking protocols.

Thus, in one embodiment, a user application loaded on one of the virtual host will be able to access the SPU directly via the network processing unit independent of the operating system of another virtual host. In other words, a user application of a first host will be able to access a physical storage device that was formatted with the operating system of a second host without the involvement of the second host's operating system.

Figure 6:
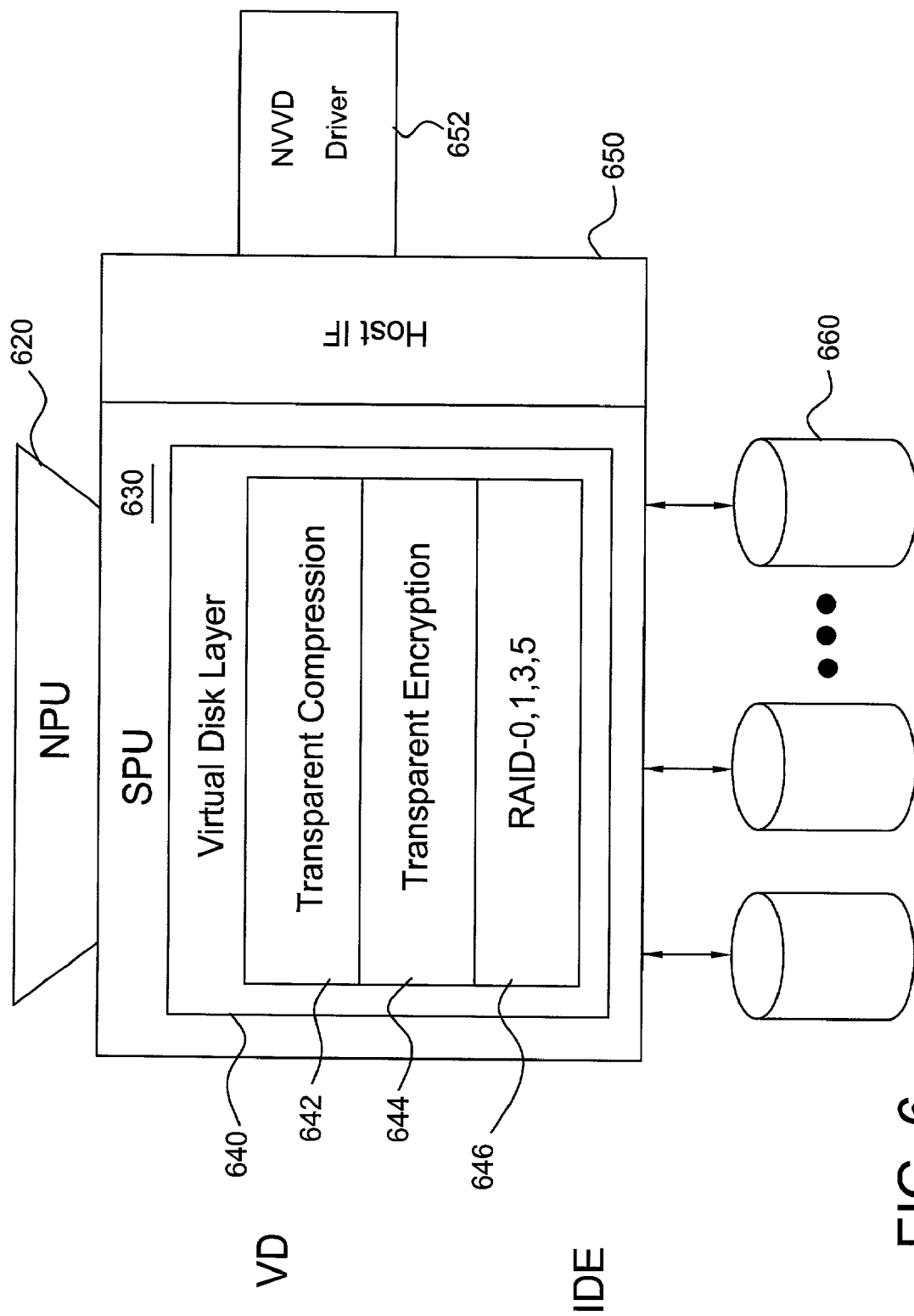
FIG. 6 illustrates a block diagram of the virtual disk functions that are performed by the SPU of the present invention.

FIG. 6 illustrates a block diagram of the disk functions that are performed by the SPU of the present invention. In one embodiment, functions previously performed by a complex disk controller are now integrated into a virtual disk layer of a chipset, e.g., shown in dash line in FIG. 2. In effect, the SPU serves as the overall file and disk management processor.

Specifically, FIG. 6 illustrates a SPU 630 comprising a virtual disk layer or module 640 for performing disk functions. The virtual disk layer or module 640, in turn, comprises three separate modules 642, 644, and 646 for performing transparent compression, transparent encryption and RAID-0, 1, 3, and/or 5 functionality, respectively.

In operation, the SPU 630 uses the main memory of the host as a cache. This is an important aspect of the present invention, since accessing the main memory is accomplished without the involvement of the host OS. Modules 642 and 644 perform transparent encryption and compression on a block level. Transparent encryption stores a key on the chipset that is inaccessible. A copy of the key is password-protected in the first block of the physical disk. Transparent compression keeps compression tag bits on the physical disk and caches them in non-volatile RAM of the host. Blocks are compressed individually, but they are concatenated on the disk to reduce rotation latency and seek time. The remapping of the compressed disks is maintained using the binary tree structure which also is stored on a reserved part of the physical disk and is cached in non-volatile RAM.

Module 646 provides RAID functionality. Namely, module 646 slices, aggregates, and applies RAID to physical disks 660 and produces new logical disk drives that are exported to the operating system of the host. To improve performance, systems may incorporate disk arrays such as a redundant array of independent disks, commonly known as RAID or RAID array, to accelerate I/O operations and to provide data redundancy. A disk array is a collection of disks 660 from one or more commonly accessible disk subsystems controlled by the SPU. The SPU software, e.g., module 646, controls the operation of the disks and presents them as one or more volumes (virtual disks) to the host or its operating system via host interface (host IF) 650 and virtual disk driver 652. In essence, the SPU presents the storage to the host as one or more volumes by transparently converting I/O operations directed at volumes to I/O operations on the underlying member disks.

Furthermore, various disk arrays exist with different cost, availability and I/O performance. Two common disk arrays are "mirrored array" and "striped array". Mirrored arrays contain two or more member disks which contain identical set of user data for improving reliability. In contrast, striped arrays generally interleave user data on two or more member disks for improving the speed of read and write operations. Currently, many different disk array configurations exist, e.g., RAID levels 0–6 and various other hybrid RAID levels which incorporate some aspects in part or in combination of the mirrored and striped array configurations. Thus, the use of disk arrays permits parallel processing of I/O operations, thereby improving I/O performance.

Additionally, the flexibility and processing power of the SPU 630 can be further exploited via the NPU 620. Namely, any other XPUs (including another NPU attached to a different host) or any one of the virtual host 510 can now access SPU 630 e.g., storing or retrieving files on disks 660, without the involvement of the host OS as disclosed above.

It should be noted that although the present invention discloses three distinction modules in the virtual disk layer of the SPU, those skilled in the art will realize that a subset of these modules (or additional modules) can be employed in accordance with a particular application. Additionally, although module 646 illustrates RAID-0,1,3,5 functionality, module 646 may implement other RAID functionality as required for a particular application.

Figure 7:
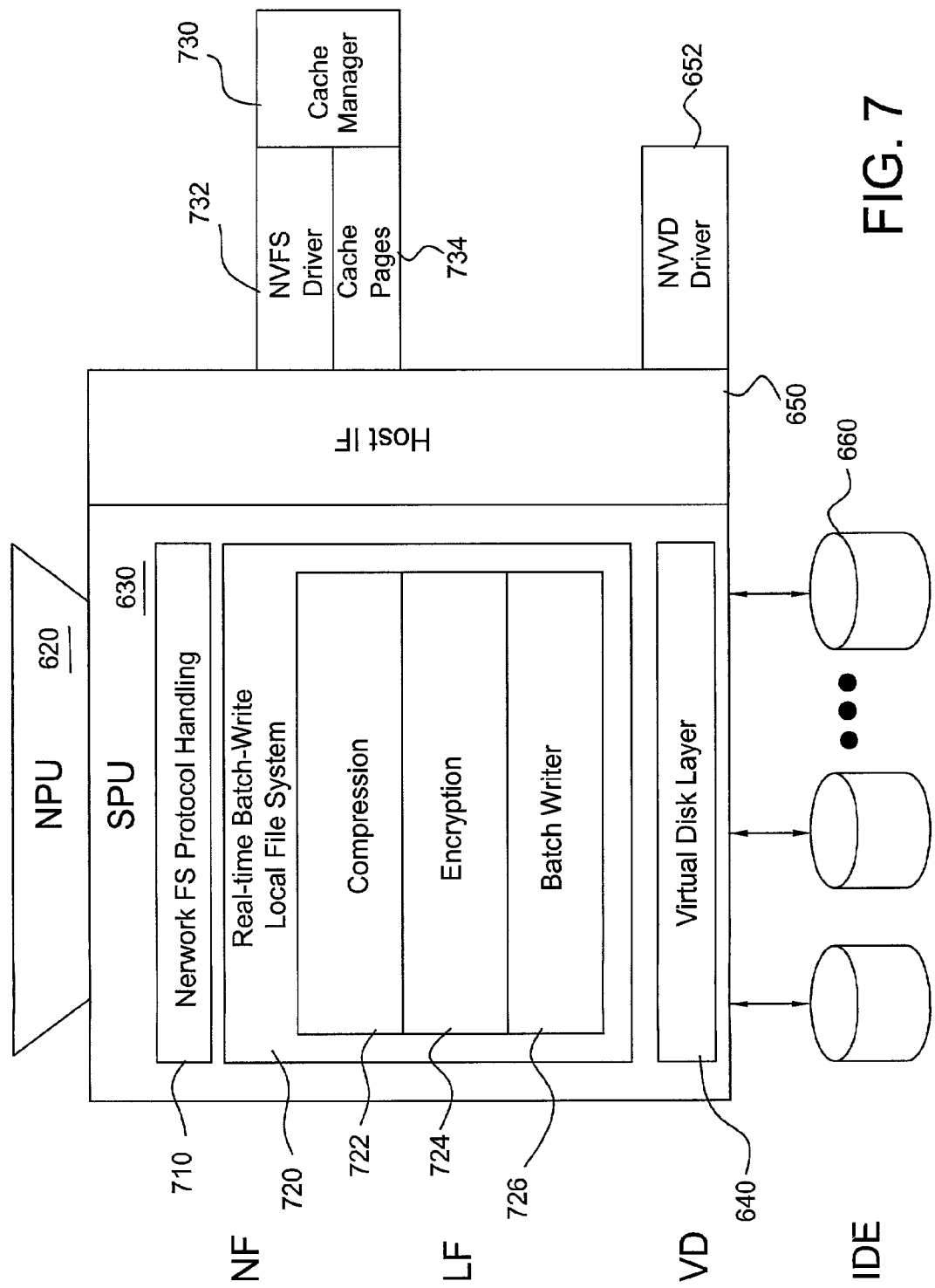
FIG. 7 illustrates a block diagram of the file handling and virtual disk functions that are performed by the SPU of the present invention.

FIG. 7 illustrates a block diagram of the file handling and virtual disk functions that are performed by the SPU 630 of the present invention. More specifically, FIG. 7 illustrates the SPU 630 comprising a file handling layer 710 in conjunction with the virtual disk layer 640 as described above in FIG. 6.

In operation, the storage processing unit (SPU) 630 effectively integrates local and remote file system handling into its file handling layer 710. The SPU 630 is connected directly to the NPU 620, thereby allowing the SPU to service both local file system accesses (e.g., by a local host, local XPUs or local virtual hosts) and remote file system accesses (e.g., by a remote host, remote XPUs or remote virtual hosts via a second NPU). In the steady-state, there is no O/S involvement and a user process may communicate directly with the SPU. Translations of virtual addresses to physical addresses are performed by the SPU. Remote requests are received via the NPU 620 and are then handled by the SPU. In turn, read data is returned via the NPU 620 without CPU/OS involvement.

The file handling layer or module 720, in turn, comprises three separate modules 722, 724, and 726 for performing file compression, file encryption and batch writing, respectively. Again, the SPU 630 uses the main memory of the host as a cache. This is an important aspect of the present invention, since accessing the main memory is accomplished without the involvement of the host OS. Modules 722 and 724 perform encryption and compression on a file level, whereas transparent encryption and compression on a block level are performed by the virtual disk layer 640. Namely, files can be compressed and encrypted on a per-file basis, and then undergo transparent compression and encryption on a per block basis, since both the file handling layer 720 and virtual disk layer 640 share the same hardware. The NPU 620 and SPU 630 have dedicated queuing for real-time isochronous file serving.

The above file integrated system as implemented via a SPU provides several advantages. First, integration of file system acceleration is achieved in a standard PC chipset without the involvement of the host OS, i.e., direct access from user space without O/S involvement. Second, cache page negotiation can be implemented between software drivers and the hardware. Third, since the SPU is implemented in hardware, the present approach provides both hardware-accelerated file compression and hardware-accelerated file encryption on either file or block basis (or both). Fourth, the present approach merges client and server side file serving, thereby allowing local file system to cache remote content. An extension of this feature allows real-time isochronous queuing paths for media serving.

It should be understood that the XPUs of the present invention can be implemented as one or more physical devices that are coupled to the host CPU through a communication channel. Alternatively, the XPUs can be represented and provided by one or more software applications (or even a combination of software and hardware, e.g., using application specific integrated circuits (ASIC)), where the software is loaded from a storage medium, (e.g., a ROM, a magnetic or optical drive or diskette) and operated in the memory of the computer. As such, the XPUs (including associated methods and data structures) of the present invention can be stored and provided on a computer readable medium, e.g., ROM or RAM memory, magnetic or optical drive or diskette and the like. Alternatively, the XPUs can be represented by Field Programmable Gate Arrays (FPGA) having control bits.

Although various embodiments which incorporate the teachings of the present invention have been shown and described in detail herein, those skilled in the art can readily devise many other varied embodiments that still incorporate these teachings. In the claims, elements of method claims are listed in a particular order, but no order for practicing of the invention is implied, even if elements of the claims are numerically or alphabetically enumerated.

What is claimed is:

1. Method for providing an integrated file subsystem, said method comprising:
   a) providing a network processor unit;
   b) providing a first host, wherein said first host comprises a main memory, a storage resource having at least one physical storage device and a central processing unit (CPU) loaded with a first host operating system, wherein said network processor unit is coupled to said CPU by a first communication path;
   c) providing a storage processing unit, wherein said network processor unit communicates with said storage processing unit via a second communication path and said CPU is directly connected to said storage processing unit via a dedicated local access channel, such that no portion of either said first communication path or said second communication path overlap with any portion of said dedicated local access channel; and
   d) streaming real-time data through a real-time queue within said network processor unit with a guaranteed latency to said at least one physical storage device or from said at least one physical storage device independent of said host operating system, wherein said real-time data is streamed from said storage processing unit to said at least one physical storage device and said real-time data is streamed to said storage processing unit from said at least one physical storage device.

2. The method of claim 1, further comprising:
   e) accessing a file on said at least one physical storage device independent of said host operating system via said network processor unit and said storage processing unit to transfer at least a portion of the file through said real-time queue or through another queue.

3. The method of claim 2, further comprising:
f) performing a compression process on said file prior to said file being stored on said at least one physical storage device independent of said host operating system.

4. The method of claim 3, further comprising:
g) performing an encryption process on said compressed file prior to said compressed file being stored on said at least one physical storage device independent of said host operating system.

5. The method of claim 4, further comprising:
h) performing a compression process on a block of said compressed and encrypted file prior to said compressed and encrypted file being stored on said at least one physical storage device independent of said host operating system.

6. The method of claim 4, further comprising:
h) performing an encryption process on a block of said compressed and encrypted file prior to said compressed and encrypted file being stored on said at least one physical storage device independent of said host operating system.

7. The method of claim 3, further comprising:
g) performing a compression process on a block of said compressed file prior to said compressed file being stored on said at least one physical storage device independent of said host operating system.

8. The method of claim 3, further comprising:
g) performing an encryption process on a block of said compressed file prior to said compressed file being stored on said at least one physical storage device independent of said host operating system.

9. The method of claim 2, further comprising:
f) performing an encryption process on said file prior to said file being stored on said at least one physical storage device independent of said host operating system.

10. The method of claim 9, further comprising:
g) performing a compression process on a block of said encrypted file prior to said encrypted file being stored on said at least one physical storage device independent of said host operating system.

11. The method of claim 9, further comprising:
g) performing an encryption process on a block of said encrypted file prior to said encrypted file being stored on said at least one physical storage device independent of said host operating system.

12. The method of claim 2, wherein said accessing step (e) uses a network protocol.

13. The method of claim 1, further comprising providing a remote node including another network processor unit and a second host, wherein said second host comprises another main memory, another storage resource having at least one physical storage device and another central processing unit (CPU) loaded with a second host operating system.

14. The method of claim 13, wherein said real-time data is streamed from said remote node to said at least one physical storage device.

15. The method of claim 13, wherein said real-time data is streamed to said remote node from said at least one physical storage device.

16. The method of claim 13, further comprising providing an auxiliary processing unit configured to produce or process said real-time data.

17. The method of claim 16, wherein said real-time data is streamed from said auxiliary processing unit to said at least one physical storage device.

18. The method of claim 16, wherein said real-time data is streamed to said auxiliary processing unit from said at least one physical storage device.

19. The method of claim 16, wherein said auxiliary processing unit performs encapsulation and decapsulation of audio packets that are transmitted to or received from said network processor unit.

20. The method of claim 16, wherein said auxiliary processing unit performs compression or decompression of video packets that are transmitted to or received from said network processor unit.

21. The method of claim 16, wherein said auxiliary processing unit processes graphics primitives and produces at least partial frame buffers.

22. The method of claim 16, wherein said auxiliary processing unit processes object positions, current velocity vectors, and force equations, and produces new positions, new velocity vectors, and collision information.

23. An integrated file subsystem, said subsystem comprising:
at least one host, wherein said at least one host comprises a main memory, a storage resource having at least one physical storage device and a central processing unit (CPU) loaded with a host operating system;
a storage processing unit; and
a network processor unit for accessing a file on said at least one physical storage device independent of said host operating system via said storage processing unit, wherein said CPU communicates with said network processor unit via a first communication path, said network processor unit communicates with said storage processing unit via a second communication path, and said CPU is directly connected to said storage processing unit via a dedicated local access channel, such that no portion of either said first communication path or said second communication path overlap with any portion of said dedicated local access channel, and said network processor includes a real-time queue and is configured to stream real-time data with a guaranteed latency from said storage processing unit to said at least one physical storage device and to said storage processing unit from said at least one physical storage device.

24. The subsystem of claim 23, wherein said storage processing unit performs a compression process on said file prior to said file being stored on said at least one physical storage device independent of said host operating system.

25. The subsystem of claim 24, wherein said storage processing unit performs an encryption process on said compressed file prior to said compressed file being stored on said at least one physical storage device independent of said host operating system.

26. The subsystem of claim 25, wherein said storage processing unit performs a compression process on a block of said compressed and encrypted file prior to said compressed and encrypted file being stored on said at least one physical storage device independent of said host operating system.

27. The subsystem of claim 25, wherein said storage processing unit performs an encryption process on a block of said compressed and encrypted file prior to said compressed and encrypted file being stored on said at least one physical storage device independent of said host operating system.

28. The subsystem of claim 24, wherein said storage processing unit performs a compression process on a block of said compressed file prior to said compressed file being stored on said at least one physical storage device independent of said host operating system.

29. The subsystem of claim 24, wherein said storage processing unit performs an encryption process on a block of said compressed file prior to said compressed file being stored on said at least one physical storage device independent of said host operating system.

30. The subsystem of claim 23, wherein said storage processing unit performs an encryption process on said file prior to said file being stored on said at least one physical storage device independent of said host operating system.

31. The subsystem of claim 30, wherein said storage processing unit performs a compression process on a block of said encrypted file prior to said encrypted file being stored on said at least one physical storage device independent of said host operating system.

32. The subsystem of claim 30, wherein said storage processing unit performs an encryption process on a block of said encrypted file prior to said encrypted file being stored on said at least one physical storage device independent of said host operating system.

33. The subsystem of claim 23, wherein said storage processing unit is implemented on a chipset.

34. The subsystem of claim 33, wherein said network processor unit is implemented on a chipset.

35. The subsystem of claim 23, wherein said network processor unit uses a network protocol.

36. The subsystem of claim 23, further comprising a remote node coupled to said network processor unit and including a second network processor unit and a second host, wherein said second host comprises another main memory, another storage resource having at least one physical storage device and another central processing unit (CPU) loaded with a second host operating system.

37. The subsystem of claim 36, wherein said network processor unit is configured to stream said real-time data from said remote node to said at least one physical storage device.

38. The subsystem of claim 36, wherein said network processor unit is configured to stream said real-time data from said at least one physical storage device to said remote node.

39. The subsystem of claim 23, further comprising an auxiliary processing unit coupled to said network processor unit through a third communication path and coupled to said CPU through a fourth communication path, wherein no portion of said third communication path overlaps with any portion of said fourth communication path.

40. The subsystem of claim 39, wherein said auxiliary processing unit is configured to perform encapsulation and decapsulation of audio packets that are transmitted to or received from said network processor unit.

41. The subsystem of claim 39, wherein said auxiliary processing unit is configured to perform compression or decompression of video packets that are transmitted to or received from said network processor unit.

42. The subsystem of claim 39, wherein said auxiliary processing unit is configured to process graphics primitives and produce at least partial frame buffers.

43. The subsystem of claim 39, wherein said auxiliary processing unit is configured to process object positions, current velocity vectors, and force equations, and produce new positions, new velocity vectors, and collision information.

44. The subsystem of claim 39, wherein said network processor unit is configured to stream said real-time data between said auxiliary processing unit and said at least one physical storage device.

* * * * *